INVENTORS
Walter Hahnemann
Ernst Wilckens
BY Hugo Lichte
ATTORNEY.

Patented Feb. 1, 1927.

1,616,185

UNITED STATES PATENT OFFICE.

WALTER HAHNEMANN, OF KITZEBERG, NEAR KIEL, ERNST WILCKENS, OF KIEL, AND HUGO LICHTE, OF BERLIN, GERMANY, ASSIGNORS TO SIGNAL GESELLSCHAFT MIT BESCHRANKTER HAFTUNG, OF KIEL, GERMANY.

SOUND PRODUCER COMPRISING A VIBRATORY SYSTEM COUPLED WITH A RESONATOR.

Application filed July 23, 1924, Serial No. 727,847, and in Germany August 8, 1923.

The invention relates to sound producers in which a vibrating mechanical structure cooperates with a resonating chamber. We have found that in apparatus of this kind the degree of coupling between the said structure and the resonating chamber is of importance, not only for determining the frequencies of resonance of the coupled system but also for determining the constancy or stability of tuning of the coupled system.

The invention has for its object to enhance the constancy of sounds produced by contrivances of this kind as to their periodicity and their amplitudes.

The inventors have discovered that a definite minimum of coupling must exist between the coupled vibratory bodies because unless this minimum exists the variability of the natural frequency of the resonating chamber in consequence of variations of temperature of its gaseous contents influences the tuning of the coupled system or apparatus to an impermissible degree.

Figure 1:
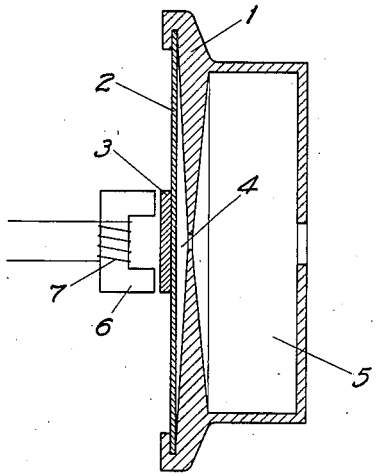

Figure 1 of the drawing shows an example of an apparatus according to the invention.

Figure 2:
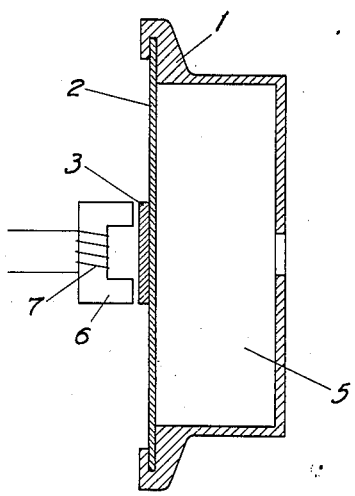

Figure 2 of the drawings shows a modification of the apparatus shown in Figure 1.

The sound producer shown in Figure 1 consists of a casing 1 closed by a diaphragm 2 carrying an armature 3. With the diaphragm 2 is coupled the resonating chamber 5 by means of a particular coupling chamber 4.

The diaphragm 2 is excited by means of an electro-magnet consisting of the armature 3 and a field magnet 6, preferably laminated and carrying the alternating current coil 7.

The coupling chamber 4 shown in Figure 1 may be omitted and the resonating chamber 5 may be so arranged that it is adjacent to the diaphragm as shown in Figure 2.

Fluctuations of the temperature of the gaseous contents of the resonating chamber 5 vary to a considerable extent the tuning of the chamber. As is well known, the velocity of propagation of sound in air varies with the temperature of the air. An increase of velocity of about two feet per second results from each temperature increase of one degree centigrade. Sound producers such as described may have to be operated in temperatures varying between −15° C. and +35° C. We have ascertained that when the gas in the resonating chamber is subjected to such a temperature range the mean velocity of the movement of the medium (gas) in the resonator rises from 1140 meters at −15° C. to 1260 meters at 35° C., a rise of 120 meters. This amounts to a change of about 6 per cent in the mean velocity of the medium movement. A corresponding change of about 6 per cent in the tuning of the resonator results. Because of the change of tuning of the resonating chamber due to temperature changes, there has been the possibility heretofore that the changes in temperature would be sufficient to cause the coupled system to fall out of resonance with the frequencies for which it was designed to be effective, for example, with the alternating exciting forces.

The inventors have found by experiment that this disadvantage just mentioned may be overcome by so constructing the apparatus that the degree of coupling between the solid vibratory body (for example, diaphragm) and the resonating chamber in percent amounts to about the same value as the per cent variation of the tuning of the medium (body of gas) in the resonating chamber under normal conditions of operation. In the example referred to above, in which the variation of tuning is 6%, the degree of coupling has to be made according to the invention, about 6% or not much less. Four per cent is in ordinary pratice substantially the lower limit.

Methods of designing beforehand a definite degree of coupling between the tuned vibratory bodies in apparatus of the described kind or in similar apparatus are known to those skilled in the art and are not intended to fall within the scope of the invention.

We claim:—

1. A method of producing sound in air consisting in agitating a tuned mechanical vibratory structure by means of vibrations of the same tuning, in transferring the vibrations of the vibratory structure to a resonating chamber of the same natural frequency as the said structure and coupled to the said structure so that the degree of coupling between them amounts to the same value in percent as the variation of the natural frequency of the resonating chamber in consequence of variations of temperature under normal conditions of operation; and in imparting the vibrations of the gaseous contents of the resonating chamber to the sound propagating medium by means of an opening of the resonating chamber.

2. A method of producing sound in air consisting in agitating a tuned mechanical vibratory structure by means of vibrations of the same tuning, in transferring the vibrations of the vibratory structure to a resonating chamber of the same natural frequency as the said structure and coupled to the said structure so that the degree of coupling between them amounts to at least 4%; and in imparting the vibrations of the gaseous contents of the resonating chamber to the sound propagating medium by means of an opening of the resonating chamber.

3. In acoustic apparatus, a tuned vibratory structure, and a tuned chamber coupled therewith, the percentage of coupling being substantially the same as the percentage of variation in the tuning of the chamber due to normal temperature changes.

4. In acoustic apparatus, a tuned vibratory structure, and a tuned chamber coupled therewith, the percentage of coupling being not less than four per cent in order to diminish the effect of the variation in the tuning of the chamber due to normal temperature changes.

In testimony whereof we affix our signatures.

WALTER HAHNEMANN.
ERNST WILCKENS.
HUGO LICHTE.